(12) United States Patent
Kim

(10) Patent No.: US 7,590,227 B2
(45) Date of Patent: Sep. 15, 2009

(54) VIDEO-READY INTERNET TELEPHONE

(75) Inventor: Do-Hoon Kim, Seoul (KR)

(73) Assignee: C&S Technology Co., Ltd., Seoul (KR)

( * ) Notice: Subject to any disclaimer, the term of this patent is extended or adjusted under 35 U.S.C. 154(b) by 1015 days.

(21) Appl. No.: 10/947,952

(22) Filed: Sep. 23, 2004

(65) Prior Publication Data

US 2005/0111438 A1   May 26, 2005

(30) Foreign Application Priority Data

Nov. 26, 2003   (KR) .................... 10-2003-0084471

(51) Int. Cl.
*H04M 11/00* (2006.01)
(52) U.S. Cl. .............. 379/93.17; 370/352; 709/231; 348/14.01
(58) Field of Classification Search .......... 709/231; 370/352; 348/14.08, 14.03, 22, 14; 379/93.17
See application file for complete search history.

(56) References Cited

U.S. PATENT DOCUMENTS

2004/0193974 A1* 9/2004 Quan et al. ............. 714/724
2005/0073574 A1* 4/2005 Krisbergh et al. ........ 348/14.01
2007/0186002 A1* 8/2007 Campbell et al. ........... 709/231

* cited by examiner

*Primary Examiner*—Fan Tsang
*Assistant Examiner*—Simon King
(74) *Attorney, Agent, or Firm*—Harness, Dickey & Pierce, PLC

(57) ABSTRACT

Disclosed is a video-ready Internet telephone which is compatible with a VoIP (Voice over Internet Protocol) telephone providing a voice communication service over the Internet. The video-ready Internet telephone includes a video processing module for converting a digital video signal into an analog video signal by using a communication protocol for video or converting an analog video signal applied thereto into an digital video signal for transmission through the Internet; and a video input/output module operated in cooperation with the video processing module, for receiving an analog video signal from a camera or receiving the converted analog video signal from the video processing module and displaying corresponding analog video data in response to the received analog video signal on a liquid crystal display (LCD).

8 Claims, 10 Drawing Sheets

VIDEO-READY INTERNET TELEPHONE

BACKGROUND OF THE INVENTION

1. Field of the Invention

The Present invention relates generally to video-ready Internet telephones, and more particularly to a video-ready Internet telephone which can be separately used as a VoIP (Voice-over Internet Protocol) telephone and also used as an MoIP (Multimedia over Internet Protocol) telephone at a low cost while utilizing peripheral equipment.

2. Background of the Related Art

The VoIP solution for providing a voice communication service over the Internet has been widely spread centering on enterprises. Such a VoIP solution enables a user to make a domestic or overseas phone call at a low call charge. Recently, with the development of an Internet infrastructure, the VoIP-based telephone call has performance which is not behind a general telephone call in terms of voice quality.

Internet-based communication has the advantage of exchanging multimedia in addition to a cost-saving effect. While making an Internet-based telephone call, a user can exchange character information or video information. There has been a growing need for a video call because users can talk over the phone while watching each other. Cellular phones supporting a digital communication already equip themselves with cameras to provide a video call service.

The demand for a video call is directed toward a future VoIP solution. However, there are significant obstacles to support a video call as already known in a cellular phone service.

First, a service cost is high. Video data needs a wider bandwidth as compared with audio data. For a natural video call, a bandwidth of approximately 600 Kbps or more should be stably supported in two-way. Thus, since the video data occupies a wide bandwidth, much more service cost is inevitably charged for the transmission and reception of the video data in comparison with the audio data. If the cost is charged by packet, i.e., the data transmission/reception unit, the whole communication charge is increased up to ten times or more the current call charge.

Second, a currently established infrastructure is unstable to support the video call. With the spread of the Internet, the performance or capacity of a network system has been improved and an ambient environment where users can access the Internet has also been improved. However, with an increase in the number of Internet users and in real-time media communication applications, a need for network bandwidth capacity has also been increased. Therefore, it is not easy to secure enough capacity of the Internet accessible by users to endure real-time communication applications such as Internet games, chatting, VoIP, MoIP, etc. In this case, there may occur data loss, delay or severe jitter in the course of communication due to the property of an Internet protocol, thereby causing inappropriate real-time video communication. This is a serious factor by which users are dissatisfied with quality of service.

Third, the price of a video telephone is high. To support video communication, a camera and a liquid crystal display (LCD) with a color screen should be provided in addition to telephone equipment. These components are main items which contribute to an increase in the price of the video telephone. The high price is a serious factor in widely spreading the video telephone market.

The present invention is intended to provide a low-priced telephone having a video call function. In more detail, the inventive telephone has a hardware architecture in which a processor for enabling users to make a video call is provided but a camera and an LCD are not equipped. The inventive telephone is basically used as a VoIP telephone and supports a video call function if it is connected to an external camera and LCD via external input and output ports. Hence, a hardware structure becomes simpler and a small-sized outer appearance suitable for mobility is achieved. First of all, the manufacturing cost of a product can be lowered. A user can select a voice call or a voice/video call according to user networks or ambient environments, thereby satisfying the various needs of the user.

The structure and operation of currently used telephones will now be described hereinbelow.

<Internet Telephone Protocol>

Internet telephones use a standard protocol defined by international standard organizations such as H.323 (International Telecommunications Union, ITU) and SIP (Internet Engineering Task Force, IETF). The Internet telephones may have somewhat different architectures according to each hardware and protocol but usually have the following software configuration. FIG. 1 shows a configuration of the typical Internet telephone.

Referring to FIG. 1, a user interface, an information service module, a telephony signaling gateway, a media module control part, a system service part, a network interface (I/F) protocol part, and a media processing part are mutually-organically connected to an application main part.

A VoIP telephone carries out communication by exchanging information on preset a calling party's voice processing capability and a called party's voice processing capability while a call is established between the two parties and determining a proper voice CODEC (Coder/Decoder). Similarly, an MoIP telephone performs communication by exchanging information on preset a calling party's voice/video processing capability and a called party's voice/video processing capability while a call is established between the two parties and determining a voice/video processing scheme.

<VoIP Telephone>

The VoIP telephone refers to a telephone intended for only a voice call among Internet telephones of a hardware construction. The VoIP telephone has the same construction as a general Public Switched Telephone Network (PSTN) telephone in both their outer appearances and operating methods. Therefore, a general telephone can be replaced by the VoIP telephone with a low call charge.

The VoIP telephone includes, as shown in FIG. 2, a main processing module 11, a voice processing module 12 for processing voice, a voice input/output (I/O) module 13 such as a handset, a speaker, etc., and a network module 14 connected to the Internet. The VoIP telephone also includes an LCD 16 or a light emitting diode (LED) for setting and displaying the state of the telephone, a keypad 15 for key input, an external I/O interface 17, and a power module 18.

<MoIP Telephone>

The MoIP telephone refers to an Internet telephone supporting video communication, which is an improved type of the VoIP telephone. As illustrated in FIG. 3, in the MoIP telephone, a video processing module 20 for processing video data and a video I/O module 30 for processing the input/output of video devices such as a video camera, an LCD, etc., are added to the construction of the VoIP telephone.

In some cases, the video processing module 20 is software-processed by the main processing module 11. However, a dedicated video processor is separately constructed to process images of high performance. Due to such hardware configuration, the price of the MoIP telephone is higher than that of the VoIP telephone. Especially, the camera and LCD are the main cause of raising the product cost.

The detailed construction of the video processing module 20 of the MoIP telephone is shown in FIG. 4. The video processing module 20 includes a video CODEC 21, a video pre-processor 22, and a video post-processor 23. The video processing module 20 converts a digital video signal into an analog video data to output the converted analog signal through the video output module, or converts an analog video signal applied thereto from the video input module into a digital signal. Further, the video processing module 20 compresses video data according to a used compression CODEC.

FIG. 5 shows a detailed construction of the video I/O module 30 of the MoIP telephone. The video I/O module 30 includes a video input processor 31, a camera 32, a video output processor 33 and an LCD 34. The video I/O module 30 receives an analog video signal from the camera 32 or receiving the converted analog video signal from the video processing module 20 to display corresponding analog video data in response to the received analog video signal on the LCD 34.

The conventional VoIP telephone has already come into wide use at a low cost, but the MoIP telephone has not in terms of various Internet environments, a service cost, a product price, etc.

In the present invention, since only a video processing module is added to the existing VoIP telephone, a terminal price can be reduced to the level of the VoIP telephone. Moreover, a voice call or voice/video call can be manually or automatically made by using one terminal according to the user environment.

SUMMARY OF THE INVENTION

Therefore, the present invention has been made to solve the above problems occurring in the prior art, and it is an object of the present invention to provide a video-ready Internet telephone which can be separately used as a VoIP telephone and also be used as a video telephone according to a user demand by providing a video processing function and having external input/output port built therein.

It is another object of the present invention to provide an algorithm for Internet voice and video call establishment and for an operating method of a menu suitable for the characteristic of a video-ready Internet telephone.

To accomplish the above objects, according to the present invention, there is provided a video-ready Internet telephone which is compatible with a VoIP (Voice over Internet Protocol) telephone providing a voice communication service over the Internet, including; a video processing module for converting a digital video signal into an analog video signal by using a communication protocol for video or converting an analog video signal applied thereto into an digital video signal for transmission through the Internet; and a video input/output module operated in cooperation with the video processing module, for receiving an analog video signal from a camera or receiving the converted analog video signal from the video processing module and displaying corresponding analog video data on a liquid crystal display (LCD).

BRIEF DESCRIPTION OF THE DRAWINGS

A more complete understanding of the present embodiments and advantages thereof may be acquired by referring to the following description taken in conjunction with the accompanying drawings wherein.

DETAILED DESCRIPTION OF THE INVENTION

Reference will now be made in detail to the present preferred embodiments of the invention, examples of which are illustrated in the accompanying drawings.

Figure 1:
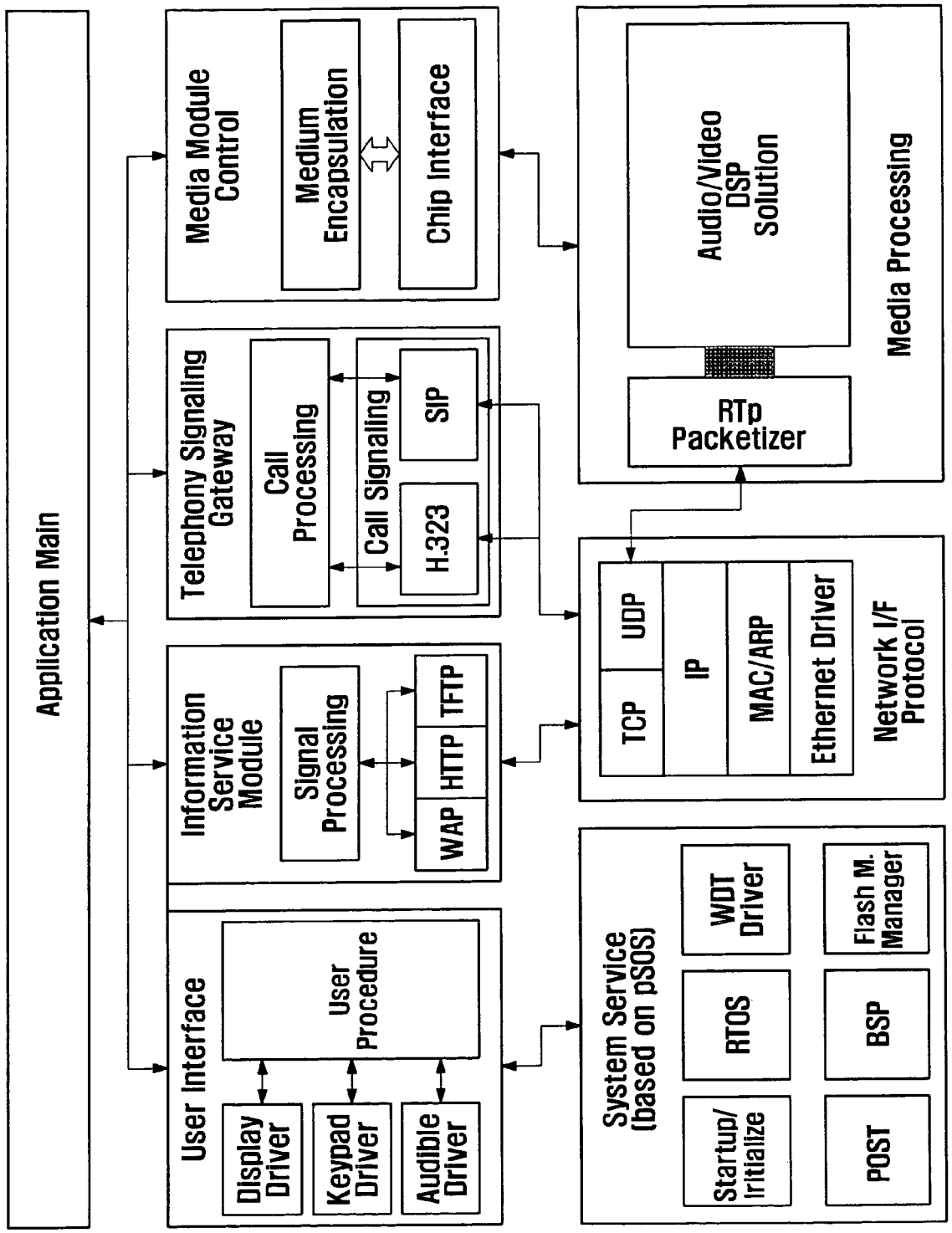
FIG. 1 shows a configuration of a conventional Internet telephone.
Figure 2:
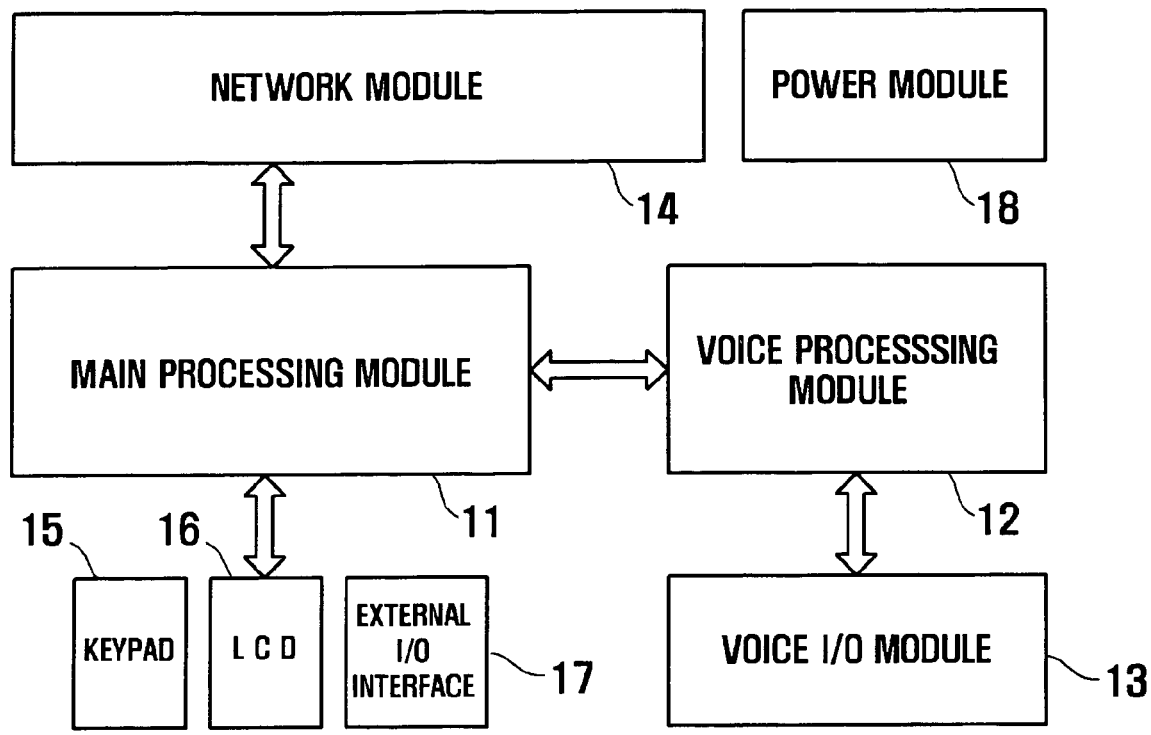
FIG. 2 is a block diagram of a VoIP telephone.
Figure 3:
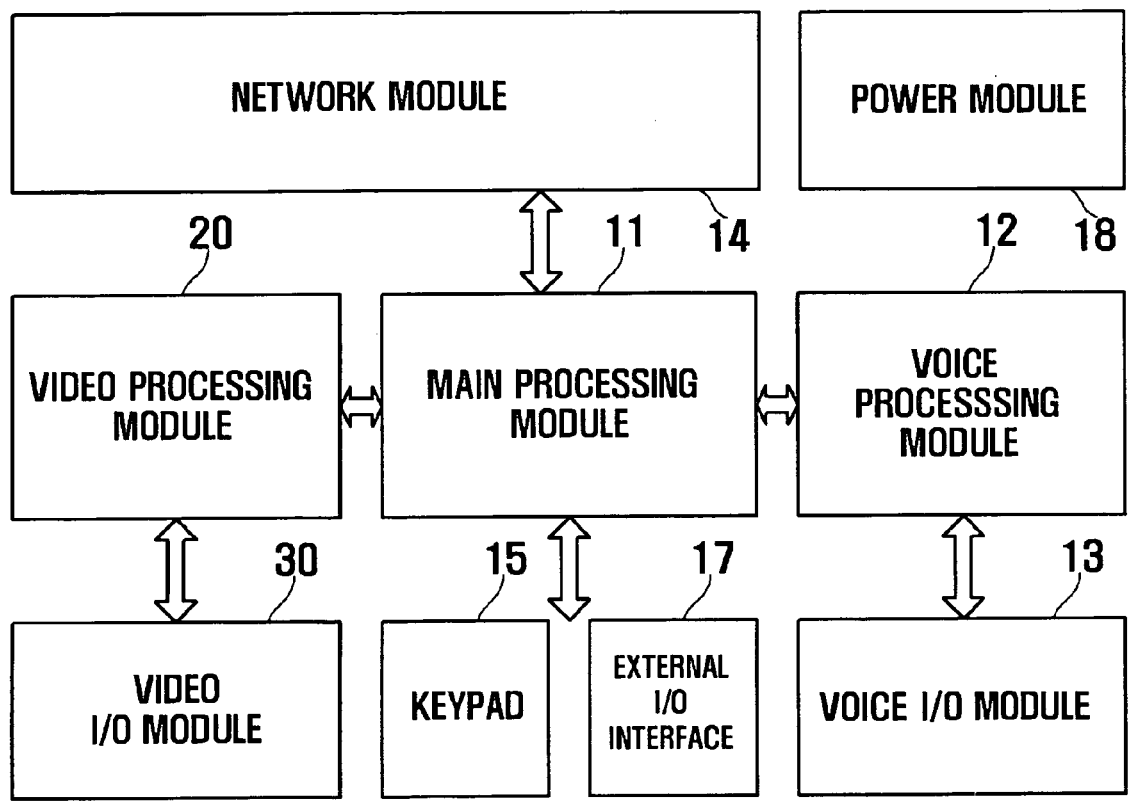
FIG. 3 is a block diagram of an MoIP telephone.
Figure 4:
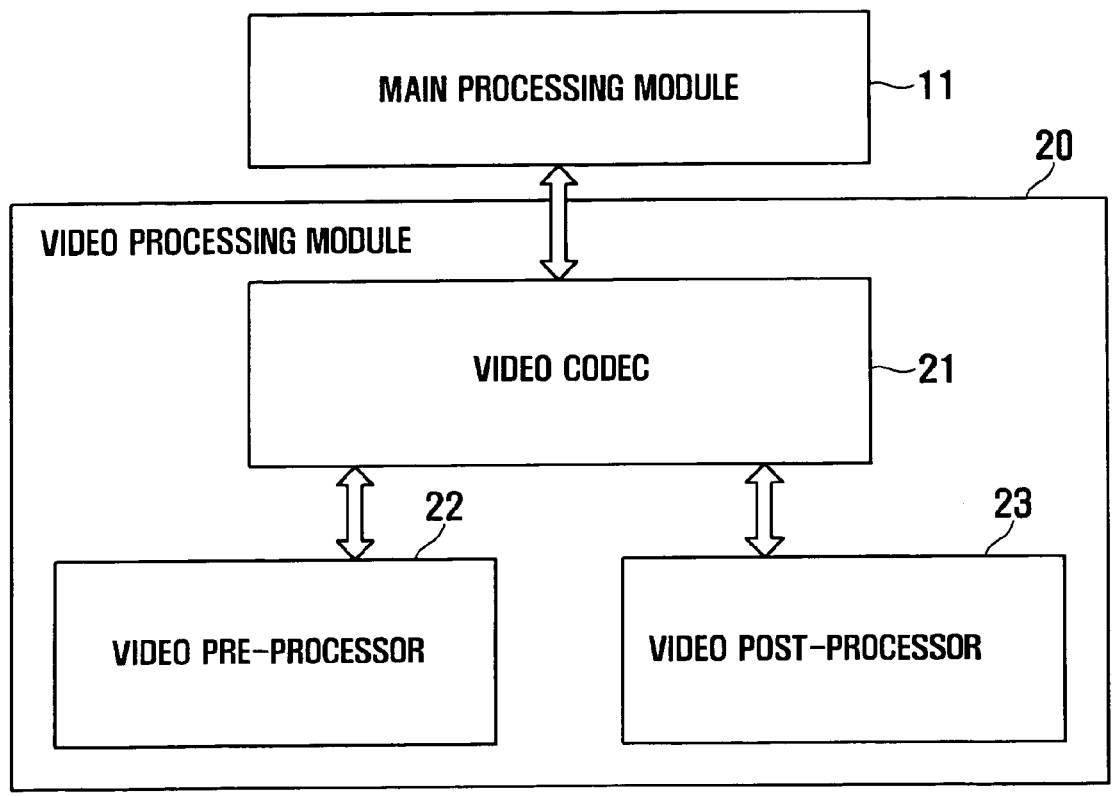
FIG. 4 is a more detailed block diagram of a video processing module of the MoIP telephone of FIG. 3.
Figure 5:
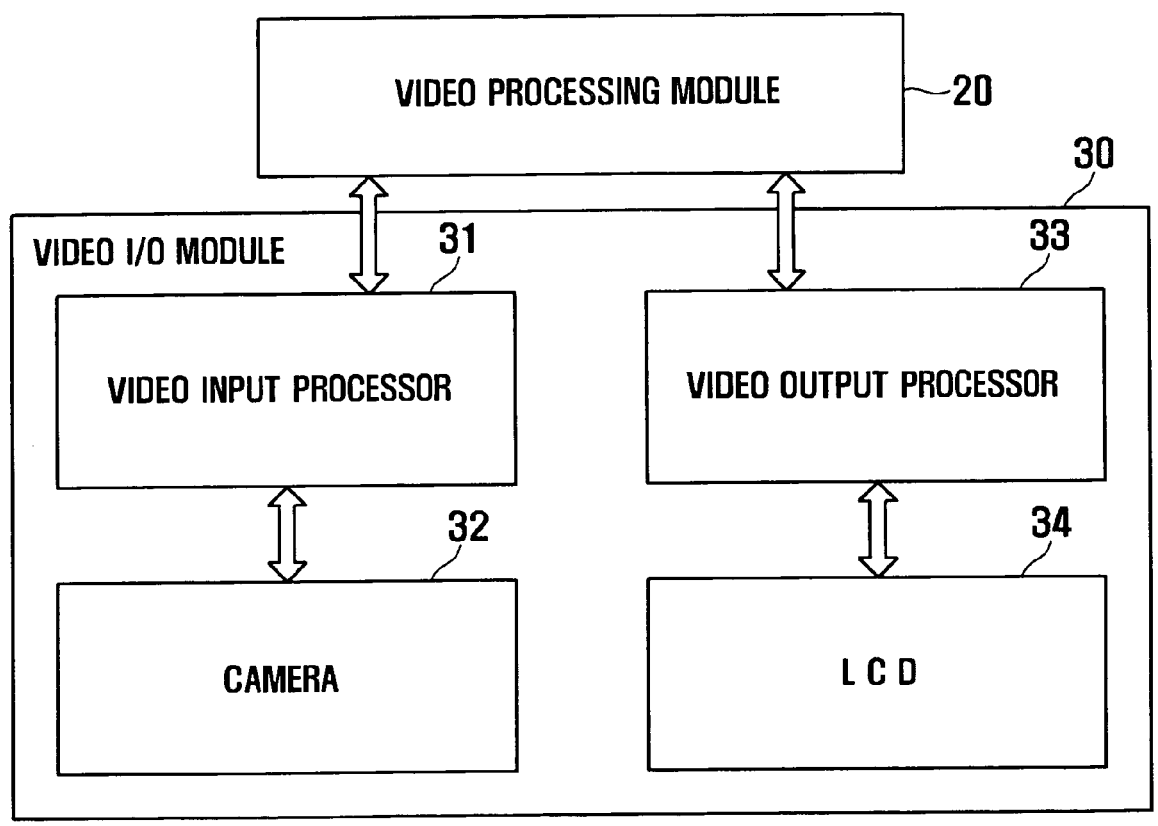
FIG. 5 is a more detailed block diagram of a general video input/output module.
Figure 6:
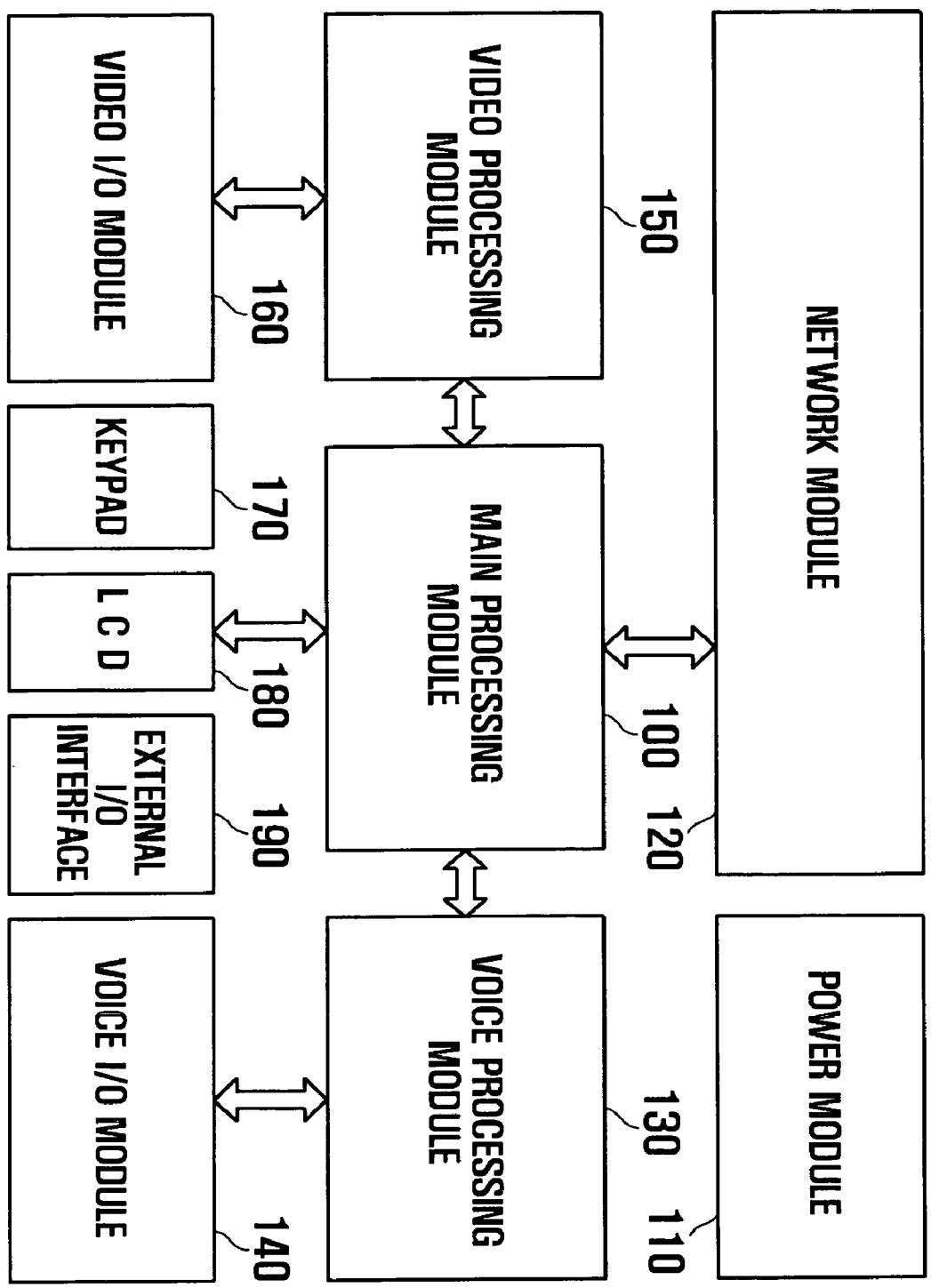
FIG. 6 is a block diagram illustrating the whole configuration of a video-ready Internet telephone according to the present invention.

FIG. 6 is a block diagram illustrating the whole configuration of a video-ready Internet telephone according to the present invention.

Referring to FIG. 6, the video-ready Internet telephone includes a main processing module 100, a power module 110, a network module 120, a voice processing module 130, a voice input/output (I/O) module 140, a video processing module 150, a video input/output (I/O) module 160, a keypad 170, a LCD 180 and an external device interface 190, The main processing module 100 has a central processing unit (CPU), a memory, a clock, etc., therein and serves to control the entire operation of a system. The power module 110 supplies electric power thereto for stably driving the system. The network module 120 establishes a communication network for connection with the Internet. The voice processing module 130 processes an audio signal using a voice CODEC such as G.723.1, G.711, and G.729. The voice input/output (I/O) module 140 is operated in cooperation with the voice processing module 130 and receives an audio data signal from a telephone transmitter (or a microphone), or outputs analog audio data corresponding to a converted analog audio signal through a telephone receiver (Or a speaker). The video processing module 150 converts a digital video signal into an analog video signal using a video CODEC such as H.261, H.263, MPEG (Moving Picture Experts Group), etc., or converts an analog video signal applied thereto into an digital video signal. The video input/output (I/O) module 160 is operated in cooperation with the video processing module 150 and receives an analog video signal from a camera, or receives the converted analog video signal from the video processing module 140 to display corresponding analog video data in response to the received analog video signal on an LCD. A keypad 170 has a video input select button and a video output select button for controlling input/output of video signals, in addition to buttons for key entry. An LCD 180 displays the current state of the telephone and characters for telephone setup. The external device interface 190 is connected to other additional equipment.

The above-described video-ready Internet telephone can be easily achieved based on the existing VoIP telephone by adding only the video processing module 150 and the video I/O module 160.

Moreover, a video call can be achieved only with the CPU of the existing VoIP phone by separately using the video processing module 150. The outer appearance is the same as the existing VoIP phone since an LCD and a camera are not included in the video I/O module 160.

In the existing Internet video telephone, various voltage levels and a high power are needed to drive the camera and the LCD. However, in the present invention, there is no need to provide an additional power for driving only the video processing module. Therefore, the configuration can be simplified just as in the VoIP telephone and less power is consumed.

Figure 7:
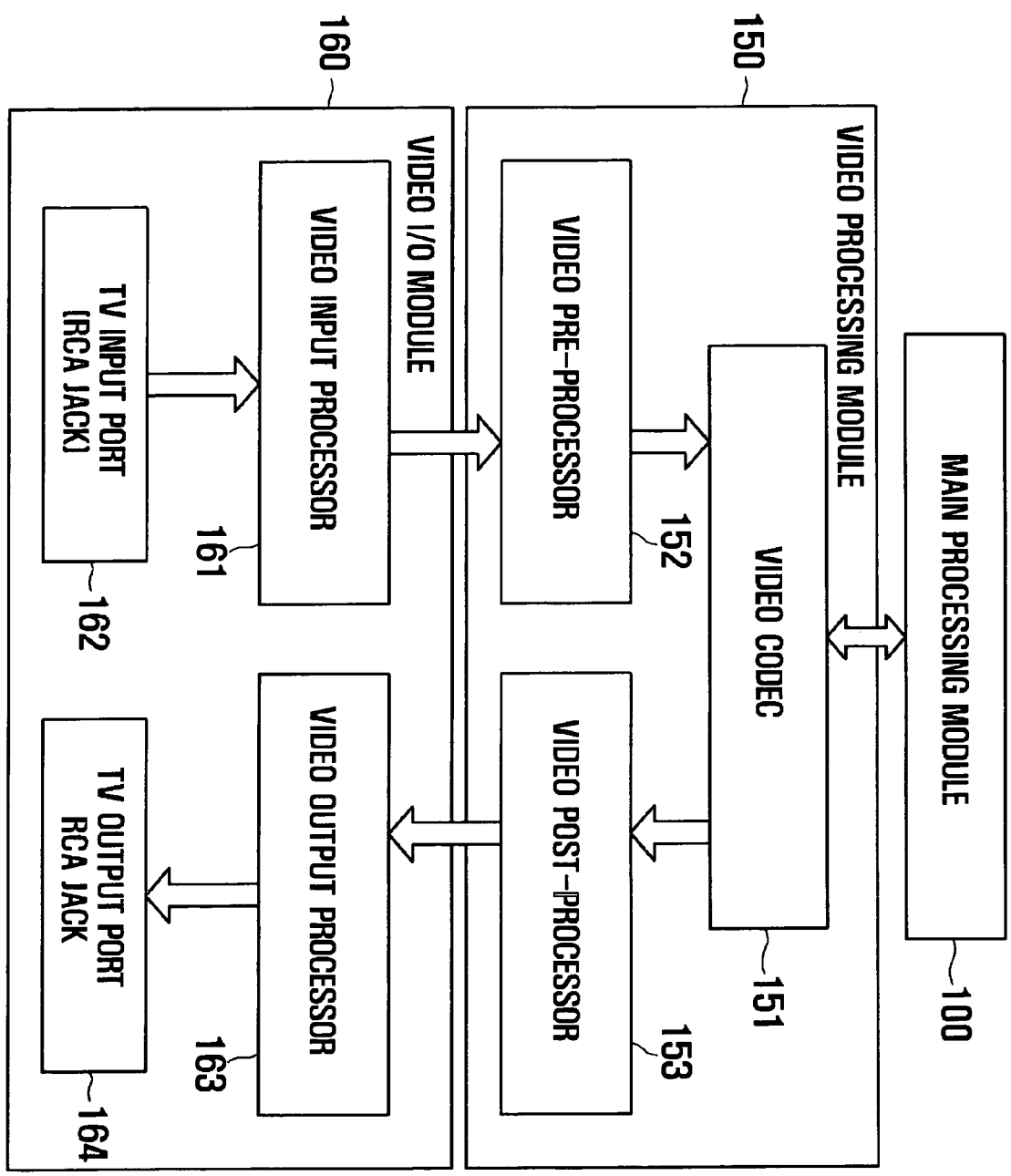
FIG. 7 is a more detailed block diagram of a video processing module and a video input/output module of the video-ready Internet telephone shown in FIG. 6.

FIG. 7 is a more detailed block diagram of the video processing module 150 and the video I/O module 160 of the video-ready Internet telephone shown in FIG. 6.

In the present invention, since an external TV signal is received and transmitted through standard RCA jacks used as TV input and output ports 162 and 164, the video-ready Internet telephone is compatible with existing video equipment. An input video of the video I/O module 160 is received as a TV signal and converted into digital video data by analog-to-digital conversion. This video data is processed in a video pre-processor 152 to adjust to a screen region and size and processed in filters for better picture quality, before being compressed in a video CODEC 151. The compressed data is transmitted through the main processor module 100 to the called party's telephone according to a video communication protocol.

The compressed video data received from the called party's telephone is unzipped in the video CODEC 151. The unzipped video data is subject to filtering, screen size zooming, digital-to-analog conversion is processed in a video post-processor 153 and a video output processor 163. The TV signal is transmitted to the exterior by the TV output port 164.

The video-ready Internet telephone according to the present invention separately operates as a VoIP telephone. It is possible to make a video phone call by connecting a video camera to an external video input port and a TV to an external video output port.

The video-ready Internet telephone can be used for video lecture if a teacher connects a video camera to the video input port and if students connect a TV to the video output port. The user can determine whether to make a video call by the use of a video input stop button or a video output stop button under the state that the video device is being connected.

Since the video input processor 161 checks an external video input signal, a video call operation can be automatically controlled by confirming whether the external video equipment is connected. This example can be applied to the case where an external output is automatically confirmed by a circuit construction in which the video output processor 163 determines whether the TV output port is short, or there is load by a connection with other video equipment.

Figure 8:
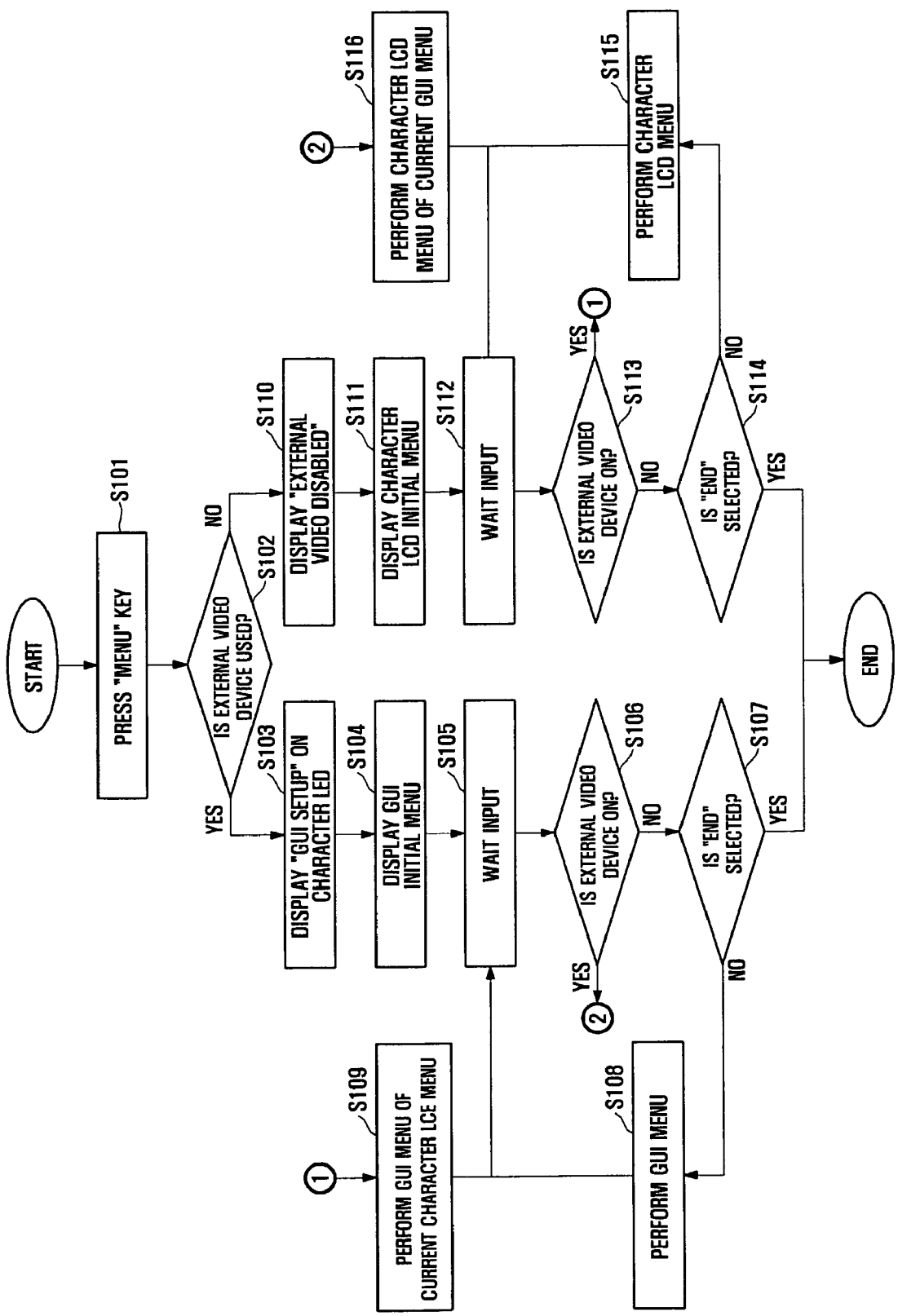
FIG. 8 is a flow chart illustrating user setup conversion in the case where the video-ready Internet telephone is separately used and a TV is connected to an external output device according to a preferred embodiment of the present invention.

FIG. 8 is a flow chart illustrating user setup conversion in the case where the video-ready Internet telephone is separately used and a TV is connected to an external output device according to a preferred embodiment of the present invention.

Under the state that a "MENU" key of an input device of the video-ready Internet telephone has been pressed (step S101), it is checked in step S102 whether to use an external video device. If the external video device is to be used, a message "GUI SETUP" is displayed on the character LCD in step S103, and a GUI (Graphic User Interface) initial menu is displayed in step S104. The procedure then proceeds to step S105 to wait an input by a user. It is checked whether the external video device is an ON state in step S106. If it is an ON state, a character LCD menu of a current GUI menu is performed. If the external video device is an OFF state, it is checked whether a message "END" of the menu is selected in step S107.

If the message "END" is not selected, the GUI menu is performed in step S108, and the GUI menu of a current character LCD menu is performed in step S109.

Meanwhile, if the external video device is not to be used in step S102, a message "EXTERNAL VIDEO DISABLED" is displayed in step S110 and a character LCD initial menu is displayed in step S111.

Thereafter, the procedure goes to step S112 to wait an input by the user. It is determined whether the external video device is an ON state in step S113. If it is an ON state, the GUI menu of the current character LCD menu is carried out. If the external video device is an OFF state in step S113, it is checked whether a message "END" of the menu is selected in step S114. If the message "END" is not selected, the character LCD menu is performed in step S115, and the character LCD menu of the current GUI menu is performed in step S116.

As described above, if the video-ready Internet telephone is used without an additional external device, it should be possible to set a menu through the character LCD so as to implement user setup and to use a telephone directory. However, it becomes more convenient if the menu is set through the GUI when the video-ready Internet telephone is connected to a TV. For this, the following user menu system is proposed. First, the user uses the same input device irrespective of the character LCD or GUI menu. The character LCD menu and the GUI menu have the same menu items and proceed in the same order. In other words, the character LCD menu and the GUI menu share menu stages of a commonly used tree form. Generally, they share data on a telephone directory, incoming/originating call number record, and system setup. Therefore, under the state that a current menu is displayed, it is possible to perform direct correspondence and conversion between the GUI and character LCD forms.

Figure 9:
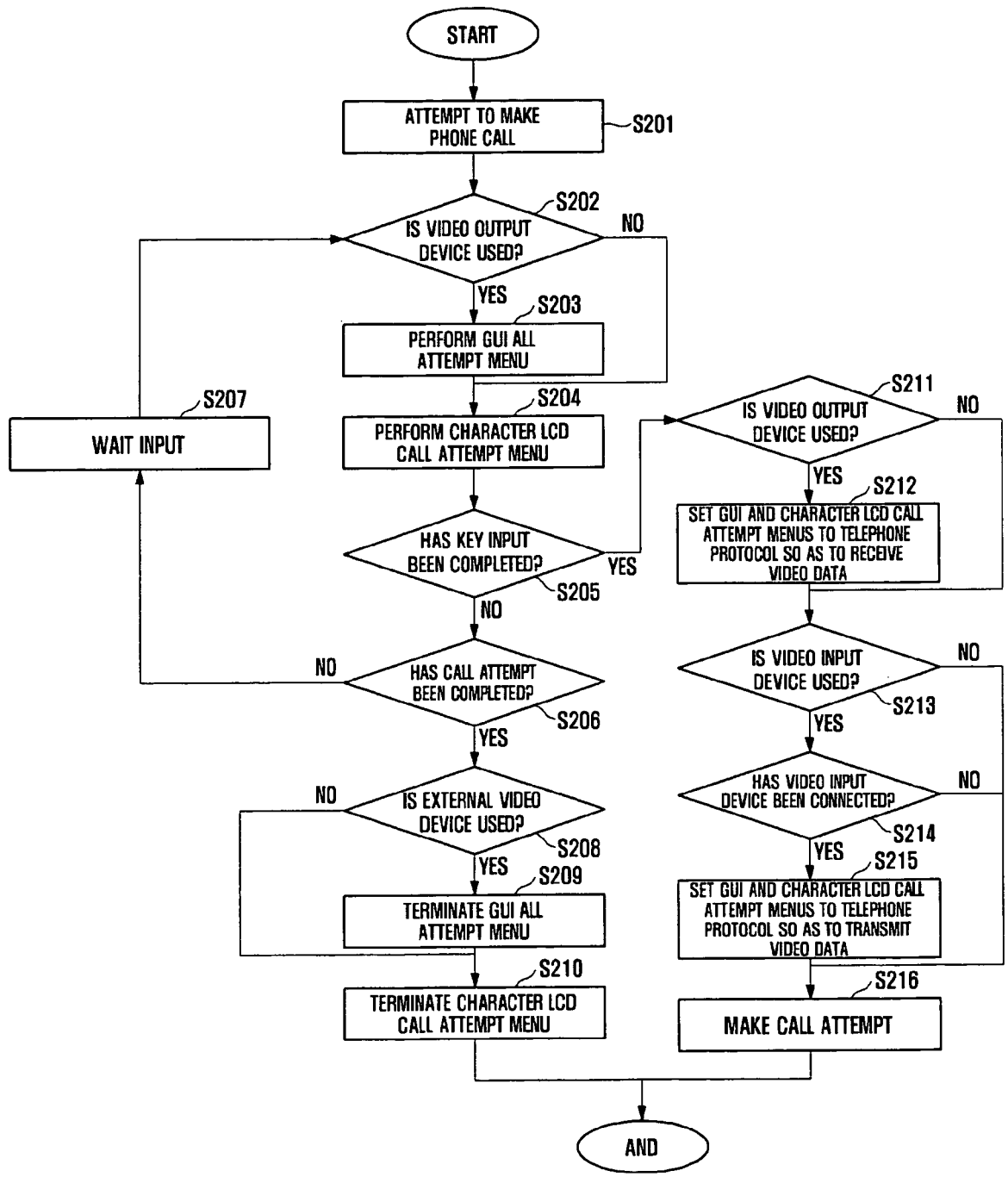
FIG. 9 is a flow chart illustrating a process of determining whether to connect only a voice call or connect a voice/video call, before the video-ready Internet telephone is used according to a preferred embodiment of the present invention.

FIG. 9 is a flow chart showing a process of determining whether to connect only a voice call or connect a voice/video call, before the video-ready Internet telephone is used according to a preferred embodiment of the present invention.

In step S201, an attempt to make a phone call is made. It is checked in step S202 whether to use a video output device. If the video output device is to be used, a GUI call attempt menu is performed in step S203 and a character LCD call attempt menu is performed in step S204. It is checked in step S205 whether an input of the call attempt menu has been completed. It is checked whether a call attempt has been completed in step S206. If it has been not completed, the procedure goes to step S207 to wait an input by the user.

If the call attempt has been completed in step S206, it is determined in step S208 whether to use the video output device. If it is to be used, the GUI call attempt menu is terminated in step S209, and the character LCD call attempt menu is terminated in step S210.

On the other hand, if the input of the call attempt menu has been completed in step S205, it is determined whether to use the video output device in step S211. If it is to be used, telephone protocol is set so as to receive video data in step S212. It is then checked in step S213 whether to use a video input device. If the video input device is to be used, it is checked whether the video input device has been connected in step S214. If it has been connected, telephone protocol is set_so as to transmit video data in step S215 and a call attempt of the telephone protocol is made in step S216.

As described above, according to the present invention, the user can determine whether to transmit and receive video data by buttons, and can transmit the video data when an external video input device is connected.

In the H.323 and SIP communication protocols, capability related to video transmission and reception is exchanged while a call is established, and only actually possible data is transmitted and received by RTP (Real-Time Protocol). Therefore, a decision indicating whether it is possible to place a video call should be set to a protocol module before a call attempt is made.

Figure 10:
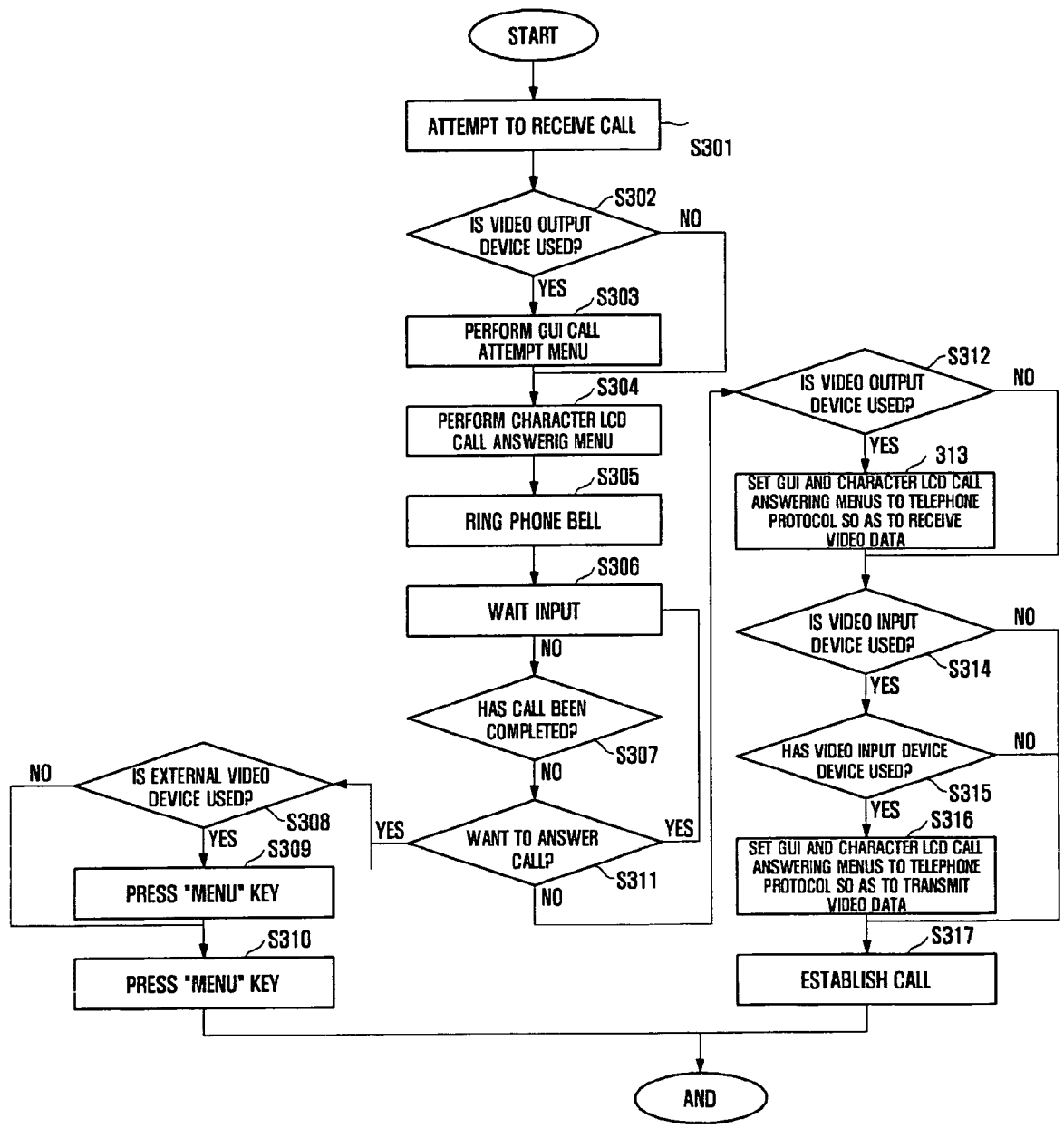
FIG. 10 is a flow chart illustrating a scenario for determining whether to place a video call when a user receives a call in the video-ready Internet telephone according to a preferred embodiment of the present invention.

FIG. 10 is a flow chart illustrating a scenario for determining whether to place a video call when a user receives a call in the video-ready Internet telephone according to a preferred embodiment of the present invention.

In step S301, an attempt to receive a call of the video-ready Internet telephone is made. It is checked in step S302 whether to use a video output device. If it is to be used, a GUI call answering menu is performed in step S303 and a character LCD call answering menu is performed in step S304. The procedure then goes to step S305 to ring a phone bell and to step S306 to wait an input by the user. It is checked in step S307 whether a call has been completed. If it has been completed, it is determined in step S308 whether to use the video output device. If it is to be used, the GUI call answering menu is terminated in step S309, and the character LCD call answering menu is terminated in step S310.

On the other hand, if the call has been not completed in step S307, it is checked in step S311 whether to answer the phone. If the user doesn't want to answer the phone, it is determined whether to use the video output device in step S312. If it is to be used, telephone protocol is set so as to receive video data in step S313. It is then checked in step S314 whether to use the video input device. If the video input device is to be used, it is checked whether the video input device has been connected in step S315. If it has been connected, telephone protocol is set_so as to transmit video data in step S316 and a call is established in step S317.

Like a call attempt described in conjunction with FIG. 9, a video call is placed only when a video call function is set when the user receives a phone call.

The inventive video-ready Internet telephone has the following advantages.

First, the video-ready Internet telephone can be separately used as a VoIP telephone. If a peripheral device is used, it can also be used as an MoIP telephone at a low cost. Especially, at a manufacturing cost similar to the conventional VoIP telephone, the video-ready Internet telephone can satisfy a users' need for being compatible with the VoIP telephone and MoIP telephone.

Second, the outer appearance of the video-ready Internet telephone can be decreased in size to that of the conventional VoIP telephone. Therefore, the video-ready Internet telephone is suitable for mobility and can be used as the MoIP telephone according to installation circumstances. In developing a new product, since almost all parts of the conventional VoIP telephone is usable, the video-ready Internet telephone can be easily converted into an MoIP product by adding only the video processing module.

Third, a connection with an external video device can be selected by the user. Conversion between a video call and a voice call is easy by the automatically selected scenario. Therefore, the use of internal equipment and network bandwidth can be minimized.

Fourth, it is possible to set the telephone by the GUI as well as by the character LCD, and conversion therebetween is easily implemented at any time. Thus more convenient user environments can be obtained.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A video-ready Internet telephone which is compatible with a VoIP (Voice over Internet Protocol) telephone providing a non video voice communication service over the Internet, the video-ready Internet telephone comprising:

a video processing module for converting a digital video signal into an analog video signal by using a communication protocol for video or converting an analog video signal applied thereto into an digital video signal for transmission through the Internet; and a video input/output module operated in cooperation with the video processing module, for receiving an analog video signal from a camera or receiving the converted analog video signal from the video processing module and displaying corresponding analog video data in response to the received analog video signal on a liquid crystal display (LCD), wherein a video call is set according to a selection of a user and a connection state with external video input and output devices detected by the video input/out module, based on a VoIP telephone function in the video processing module and the video call is established through using a central processing unit (CPU) performance of said VoIP telephone.

2. The video-ready Internet telephone of claim 1, wherein the video-ready Internet telephone separately performs a VoIP telephone function, or performs an MoIP (Multimedia over Internet Protocol) telephone function according to the use of external video input and output devices.

3. The video-ready Internet telephone of claim 2, wherein the external video input and output devices include a character/graphic LCD as a user interface.

4. The video-ready Internet telephone of claim 2, wherein the external video input and output devices include a TV and a CRT (Cathode Ray Tube)/TFT-LCD (Thin Film Transistor-LCD), for displaying analog video data thereon.

5. The video-ready Internet telephone of claim 2, wherein if the video-ready Internet telephone is used without any external video input and output devices, a menu is set through a character LCD so as to implement user setup and to use a telephone directory.

6. The video-ready Internet telephone of claim 2, wherein if the video-ready Internet telephone is connected to an external TV port, a menu is set through a graphic user interface so as to implement user setup and to use a telephone directory.

7. The video-ready Internet telephone of claim 1, further comprising:

a power module for supplying electric power thereto for stably driving the video-ready Internet telephone;

a network module for establishing a communication network for connection with the Internet;

a main processing module having a central processing unit (CPU), a memory, a clock, therein and operated in cooperation with the network module, the video processing module and the video input/output module to control the entire operation of the video-ready Internet telephone;

a voice processing module operated in cooperation with the main processing module, for processing an audio signal using a voice CODEC (Coder/Decoder);

a voice input/output module operated in cooperation with the voice processing module, for receiving an analog audio signal from a microphone, or outputting analog audio data corresponding to a converted analog audio signal through a speaker;

a key input part operated in cooperation with the main processing module and having a video input select button and a video output select button for controlling input/output of video signals, in addition to buttons for key entry;

a display unit operated in cooperation with the video input/output module, for displaying the current state of the telephone and characters for telephone setup; and an external device interface operated in cooperation with the main processing module and adapted to be connected to other additional equipment.

8. The video-ready Internet telephone of claim 7, wherein a voice CODEC such as G.723.1, G.711, and G.729 is applied to the voice processing module, and a video CODEC such as H.261, H.263, and MPEG (Moving Picture Experts Group) is applied to the video processing module.

* * * * *